(12) United States Patent
Shima et al.

(10) Patent No.: US 8,070,212 B2
(45) Date of Patent: Dec. 6, 2011

(54) ARRANGING STRUCTURE OF WIRE HARNESS FOR MOTOR VEHICLE

(75) Inventors: Kazuya Shima, Suzuka (JP); Yoshinao Kobayashi, Suzuka (JP); Shigeki Murayama, Suzuka (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 376 days.

(21) Appl. No.: 12/524,458

(22) PCT Filed: May 9, 2007

(86) PCT No.: PCT/JP2007/059575
§ 371 (c)(1),
(2), (4) Date: Jul. 24, 2009

(87) PCT Pub. No.: WO2008/096458
PCT Pub. Date: Aug. 14, 2008

(65) Prior Publication Data
US 2010/0026043 A1 Feb. 4, 2010

(30) Foreign Application Priority Data
Feb. 5, 2007 (JP) .................................. 2007-025249

(51) Int. Cl.
*B60R 16/027* (2006.01)
*H02G 11/00* (2006.01)
(52) U.S. Cl. ........ 296/155; 49/360; 296/146.9; 296/208
(58) Field of Classification Search .................... 49/360; 174/24, 68.1, 68.3, 72 A, 96, 97, 100; 191/12 R; 248/51; 296/146.9, 146.11, 146.12, 155, 296/208; 439/445, 446, 447, 448
See application file for complete search history.

(56) References Cited

U.S. PATENT DOCUMENTS

| | | | | |
|---|---|---|---|---|
| 3,664,619 A | * | 5/1972 | Heidrich et al. | 248/51 |
| 5,134,251 A | * | 7/1992 | Martin | 174/136 |
| 6,027,352 A | * | 2/2000 | Byrne | 439/215 |
| 6,492,592 B1 | * | 12/2002 | Murofushi et al. | 174/72 A |
| 6,510,682 B2 | * | 1/2003 | Komiya et al. | 59/78.1 |
| 6,566,603 B2 | * | 5/2003 | Doshita et al. | 174/72 A |
| 6,595,473 B2 | * | 7/2003 | Aoki et al. | 248/74.4 |
| 6,700,064 B2 | * | 3/2004 | Aoki et al. | 174/69 |

(Continued)

FOREIGN PATENT DOCUMENTS

JP  2004-40862  2/2004

(Continued)

OTHER PUBLICATIONS

English language Abstract of JP 2005-310675, Nov. 4, 2005.

(Continued)

*Primary Examiner* — Glenn Dayoan
*Assistant Examiner* — Paul Chenevert
(74) *Attorney, Agent, or Firm* — Greenblum & Bernstein P.L.C.

(57) ABSTRACT

An arranging structure spans a wire harness for a motor vehicle between a vehicle body and a slide member. The structure includes a corrugated tube for sheathing the wire harness; a protector made of a resin material, the protector holding opposite ends of the corrugated tube in a longitudinal direction and threading the wire harness; and a rotary member integrated with the protector or coupled to the protector as a different element from the protector, the rotary member being rotatably supported on supporting members provided on the vehicle body and the slide member.

8 Claims, 7 Drawing Sheets

U.S. PATENT DOCUMENTS

| | | | |
|---|---|---|---|
| 6,787,702 B2 * | 9/2004 | Suzuki | 174/72 A |
| 6,811,404 B2 * | 11/2004 | Doshita et al. | 439/34 |
| 6,818,827 B2 * | 11/2004 | Kato et al. | 174/72 A |
| 6,984,782 B2 * | 1/2006 | Ikeda et al. | 174/21 JS |
| 7,053,306 B2 * | 5/2006 | Tsubaki et al. | 174/72 A |
| 7,075,011 B1 * | 7/2006 | Kogure et al. | 174/72 A |
| 7,119,275 B2 * | 10/2006 | Suzuki et al. | 174/503 |
| 7,151,224 B2 * | 12/2006 | Kogure et al. | 174/72 A |
| 7,220,129 B1 * | 5/2007 | Nishijima et al. | 439/34 |
| 7,253,361 B2 * | 8/2007 | Nishijima et al. | 174/72 A |
| 7,265,294 B2 * | 9/2007 | Tsunoda et al. | 174/72 A |
| 7,279,638 B2 * | 10/2007 | Kisu et al. | 174/72 A |
| 7,284,785 B2 * | 10/2007 | Gotou et al. | 296/155 |
| 7,614,902 B2 * | 11/2009 | Bayat et al. | 439/446 |
| 7,645,938 B2 * | 1/2010 | Kogure et al. | 174/72 A |
| 7,804,027 B2 * | 9/2010 | Murayama et al. | 174/68.3 |
| 7,861,508 B2 * | 1/2011 | Murayama et al. | 59/78.1 |
| 2004/0003543 A1 | 1/2004 | Kobayashi et al. | |
| 2004/0250525 A1 | 12/2004 | Kobayashi | |
| 2005/0062310 A1 | 3/2005 | Kida et al. | |
| 2005/0253384 A1 | 11/2005 | Taira | |
| 2006/0090920 A1 | 5/2006 | Fujita | |
| 2007/0025061 A1 | 2/2007 | Kogure et al. | |

FOREIGN PATENT DOCUMENTS

| | | |
|---|---|---|
| JP | 2004-40863 | 2/2004 |
| JP | 2004-282879 | 10/2004 |
| JP | 2005-102359 | 4/2005 |
| JP | 2005-310675 | 11/2005 |

OTHER PUBLICATIONS

English language Abstract of JP 2004-282879, Oct. 7, 2004.
English language Abstract of JP 2005-102359, Apr. 14, 2005.
English language Abstract of JP 2004-40863, Feb. 5, 2004.
English language Abstract of JP 2004-40862, Feb. 5, 2004.

* cited by examiner

ARRANGING STRUCTURE OF WIRE HARNESS FOR MOTOR VEHICLE

FIELD OF THE INVENTION

This invention relates to an arranging structure of a wire harness for a motor vehicle, and more particularly relates to an arranging structure in which a corrugated tube sheathes a wire harness spanned between a vehicle body and a slide member to prevent the wire harness sheathed by the corrugated tube from hanging down and interfering with peripheral members.

BACKGROUND OF THE INVENTION

Before, in order to supply at all times electrical power to electrical components in a slide member, such as a slide door of a motor vehicle, a wire harness is spanned between a vehicle body and a slide member. In such a kind of arranging structure, for example, a construction shown in FIG. 11 (JP 2004-40863A) has been proposed. In this construction, a wire harness W/H is threaded into a crawler type cable guide 2 in which a plurality of link members 1 are coupled to one another on a line. The crawler type cable guide 2 that threads wire harness W/H is arranged between a vehicle body 3 and a slide door 4 in an S-shaped path.

The crawler type cable guide 2 has not only a function of protecting an electrical cable but also functions of controlling a bending of the wire harness W/H and of preventing the wire harness W/H from interfering with peripheral members by giving a clearance between the vehicle body and the wire harness W/H On the other hand, the crawler type cable guide 2 is expensive and the wire harness W/H threaded into the crawler type cable guide 2 is exposed from clearances among the link members 1. Accordingly, it is necessary for a tube 5 shown in FIG. 12 to further sheathe the crawler type cable guide 2 so as to prevent the wire harness W/H from being exposed. This will increase the number of parts and costs in production.

Some of the slide members, such as slide doors, move up and down in a direction perpendicular to a sliding direction while changing the moving angles. It is necessary to further provide an upward and downward moving mechanism shown in FIG. 13 (JP 2004-40862A) in order to follow such vertical movement.

That is, it is necessary to provide a coupling member 7 that is supported rotatably in upward and downward directions (directions shown by arrows T) between a fixing member 6 secured to the vehicle body 3 and an end of the crawler type cable guide 2. This will increase the number of parts and make the arranging structure complicated.

On the other hand, there is a construction in which a corrugated tube provided with annular crests and troughs arranged alternately in an axial direction is used as a sheathing member for a wire harness in lieu of the crawler type cable guide and the opposite ends of the corrugated tube are supported on supporting members provided with rotary mechanisms.

Thus, if the corrugated tube is used as a sheathing member, it is possible to suppress costs, not to expose the wire harness outward and to absorb an upward and downward movement of the slide member by flexibility of the corrugated tube, thereby permitting the wire harness to smoothly follow the motion of the slide member.

However, it is difficult to control a trajectory of the corrugated tube in a following action on account of flexibility of the corrugated tube and there is a possibility that the corrugated tube hangs down during the following action and interferes with peripheral members.

Patent Document 1: JP 2004-40863A
Patent Document 2: JP 2004-40862A

SUMMARY OF THE INVENTION

Problems to be Solved by the Invention

In view of the above problems, an object of the present invention is to provide an arranging structure of a wire harness spanned between a vehicle body and a slide member of a motor vehicle in which even if a corrugated tube is used as a sheathing member for the wire harness, the wire harness sheathed by the corrugated tube neither hangs down nor interferes with peripheral members and can follow smoothly the slide member.

Means for Solving the Problems

In order to achieve the above object, the present invention provides an arranging structure that spans a wire harness for a motor vehicle between a vehicle body and a slide member. The structure comprises: a corrugated tube for sheathing the wire harness; a protector made of a resin material, the protector holding opposite ends of the corrugated tube in a longitudinal direction and threading the wire harness; and a rotary member integrated with the protector or coupled to the protector as a different element from the protector, the rotary member being rotatably supported on supporting members provided on the vehicle body and the slide member.

As described above, since the corrugated tube sheathes the wire harness, it is possible to reduce a cost of a product in comparison with the case where the wire harness is threaded in a crawler type cable guide. Since the flexible corrugated tube can absorb an upward and downward movement of the slide door, it is possible to permit the wire harness to smoothly follow a movement of the slide door without providing an additional device, such as an upward and downward movement mechanism.

Also, since the corrugated tube sheathes the wire harness, the wire harness is not exposed outward. Accordingly, it is not necessary to provide a tubular body that covers a cable guide in the case of inserting the wire harness into the crawler type cable guide and it is possible to reduce the number of parts.

Also, as described above, the rotary members are rotatably supported on the supporting members provided on the vehicle body and slide member, and the resin protector holds the longitudinal end portions of the corrugated tube between the rotary members and the corrugated tube and threads the wire harness. Thus, the corrugated tube is used as a sheath member on an intermediate part in a wire harness arranging area between the vehicle body and the slide member and the opposite ends of the corrugated tube are held by the protector having a higher hardness than the corrugated tube. Accordingly, it is possible to prevent the corrugated tube from hanging down and from interfering with peripheral members.

A length of the corrugated tube that sheathes the wire harness is set to be a length in which the wire harness does not interfere with peripheral members during an entire process in which the wire harness follows the motion of the slide member. The length depends upon a kind of motor vehicle in which the wire harness is arranged, an arranging position of the wire harness, a temperature condition, and the like. In view of reducing the number of parts and enhancing a following function to the slide member, it is preferable that the length of the corrugated tube sheathing the wire harness is set to be as long as possible within a range in which the corrugated tube does not interfere with the peripheral members.

It is preferable that the corrugated tube is made of a material having a soft and flexible nature, for example, polypropylene (PP), polyethylene propylene rubber (EPDM), or various kinds of elastomer.

It is preferable that the protector is made of a resin material that has a higher hardness than the corrugated tube, for example, polybutylene terephthalate (PBT), polyacetal (POM), or the like.

As described above, the rotary members that are rotatably supported on the supporting members of the vehicle body and slide member may be integrated with or separated from the protector.

For example, in the case where even if the corrugated tube that sheathes the wire harness is set to be relatively long, the corrugated tube can avoid interfering with the peripheral members, the protector and rotary members that hold the opposite ends of the corrugated tube may be integrated. In this case, it is possible to permit the wire harness to smoothly follow the motion of the slide member. It is preferable that the rotary members are integrated with the protector in view of reducing the number of parts.

On the other hand, the protector and rotary member may be formed into different elements. The protector is provided with projections on upper and lower surfaces of an end at a coupling side to the rotary member. The rotary member is provided on upper and lower surfaces with through-holes. The protector and rotary member are coupled to each other rotatably in right and left directions by inserting the projections into the through-holes, respectively. When the wire harness that follows the motion of the slide member rotates in the right and left directions, an end of the protector at the coupling side contacts with an inner surface of a side wall of the rotary member, and a rotary angle of the protector in the right and left directions is restrained within a given range.

For example, even if the length of the corrugated tube in which the opposite ends are held by the protector is set to be a maximum length that can avoid an interference between the corrugated tube and the peripheral members, there is a case where the corrugated tube cannot follow the motion of the slide member smoothly on account of a kind of motor vehicle and an arranging position of the wire harness if the protector and rotary member are integrated together. In this case, as described above, the protector and rotary member are formed into different elements, the protector is provided on the upper and lower surfaces at the coupling side to the rotary member with the projections that serves as a rotary axle, and the rotary member is provided on the upper and lower surfaces with the through-holes that receive the projections rotatably in the right and left directions. Consequently, it is possible to rotatably couple the protector and rotary member to each other and it is possible to permit the wire harness to follow the motion of the slide member, even if the corrugated tube has a relatively short length.

Also, as described above, when the wire harness rotates in the right and left directions while the wire harness is following the slide door, the coupling end of the protector contacts with the inner surface of the side wall of the rotary member to restrain the protector from rotating in the right and left directions. Consequently, it is possible to prevent the wire harness from interfering with the peripheral members on account of a high flexibility in rotation of the protector and is possible to prevent electrical wires from being damaged due to repetition of a great bending of the wire harness.

Furthermore, in order to enhance a following function of the corrugated tube to the slide member in accordance with the length of the corrugated tube, the protector may be divided into a plurality of segments and the respective segments may be rotatably coupled to one another so that the respective segments can rotate in the right and left directions.

That is, the protector is divided into a plurality of segments. One segment of the protector is provided on upper and lower surfaces with projections while the other segment of the protector is provided on upper and lower surfaces with through-holes. The segments are coupled to one another by inserting the projections on the one segment into the through-holes in the other segment. When the wire harness that follows a motion of the slide member rotates in the right and left directions, an end of the protector at the coupling side contacts with an inner surface of a side wall of the rotary member, and a rotary angle of the protector in the right and left directions is restrained within a given range.

As described above, it is possible to permit the wire harness to smoothly follow the motion of the slide member by dividing the protector into the plural segments and by rotatably interconnecting the respective segments.

When the wire harness that follows the slide member rotates in the right and left directions, the coupling end of the one segment of the protector contacts with the inner surface of the side wall of the other segment of the protector to restrain the segments of the protector from rotating in the right and left directions. Consequently, it is possible to prevent the wire harness from interfering with the peripheral members on account of a high flexibility in rotation of the segments of the protector and is possible to prevent electrical wires from being damaged due to repetition of a great bending of the wire harness.

As described above, the rotary members are rotatably supported on the supporting members of the vehicle body and slide member. In such supporting structure, for example, the rotary member is provided on an upper surface at a coupling side to the supporting member with an upward projecting cylindrical portion for drawing the wire harness to the supporting member and is also provided on a lower surface at a coupling side to the supporting member and at a position corresponding to the cylindrical portion on the upper surface with a downward projecting cylindrical portion having the same configuration as that of the portion. The upward and downward projecting cylindrical portions serve as a rotary axle for the rotary member. That is, the supporting members of the vehicle body and slide member are provided on upper and lower surfaces with through-holes. The upward and downward projecting cylindrical portions of the rotary members are inserted into the through-holes in the supporting members to support the cylindrical portions. Thus, the rotary members can be rotatably supported on the supporting members.

Preferably, the rotary member or the protector is provided on opposite side walls at the end side having the through-holes with a cover having an arcuate side wall. The rotary member or the protector is provided on the opposite side walls at the end side having projections of an adjacent protector with protrusions that can be inserted into the cover and have an arcuate side surface. The cover and protrusions do not expose the wire harness outward when the protector rotates.

As described above, the rotary member or the protector is provided on opposite side walls at the end side having the through-holes with a cover having an arcuate side wall. The rotary member or the protector is provided on the opposite side walls at the end side having projections of an adjacent protector with protrusions that can be inserted into the cover and have an arcuate side surface. Thus, if the protector rotates in the right or left direction when the wire harness is bent, the protrusions of the protector that have the arcuate side wall are deeply inserted into an inner part of the cover of the rotary member at an inner peripheral side of the bent wire harness and the protrusions of the protector is drawn out from the cover of the rotary member at an outer peripheral side of the bent wire harness. That is, even if the wire harness is in the bent position, the covers and the outward drawn protrusions do not expose the wire harness from a coupling portion between the rotary member and the protector.

Accordingly, the protector and rotary member, and the intermediate corrugated tube, constructed above, do not expose the wire harness outward over the entire arranging area, thereby protecting the wire harness in good appearance.

Preferably, the protector that holds the corrugated tube is provided on an inner peripheral surface with annular uneven portions, the annular uneven portions of the protector engage with annular uneven portions on an end of the corrugated tube.

According to the above construction, it is possible to easily interconnect the end of the corrugated tube and the protector merely by providing the annular uneven portions, which can engage with the annular uneven portions of the corrugated tube, on the inner surface of the protector that holds the corrugated tube. Furthermore, since the annular uneven portions engage with each other over the entire peripheries, it is possible to obtain a strong fitting. Accordingly, it is possible to prevent the corrugated tube from coming out from the protector.

In order to obtain a further strong fitting, it is preferable that the protector is provided on the entire inner peripheral surface of the portion for protecting the corrugating tube with continuous annular uneven portions and the annular uneven portions on the end of the corrugated tube are engaged with the continuous annular uneven portions of the protector.

Also, the protector and rotary member are divided into half segments along an axial direction, respectively. When a locking portion provided on the half section is engaged with a portion being locked provided on the half section, the protector and rotary member are formed.

According to the above construction, it is possible to easily interconnect the corrugated tube and protector and to readily thread the wire harness into the protector and rotary member.

Although the slide member is not limited so long as the slide member can slide, the present invention can be suitably applied to a slide door.

EFFECTS OF THE INVENTION

As described above, according to the present invention, since the corrugated tube sheathes the wire harness, it is possible to reduce a cost of a product in comparison with the case where the wire harness is threaded in a crawler type cable guide. Since the flexible corrugated tube can absorb an upward and downward movement of the slide door, it is possible to permit the wire harness to smoothly follow a movement of the slide door without providing an additional device, such as an upward and downward movement mechanism. Also, since the corrugated tube sheathes the wire harness, the wire harness is not exposed outward. Accordingly, it is not necessary to provide a tubular body that covers a cable guide in the case of inserting the wire harness into the cable guide and it is possible to reduce the number of parts.

Also, as described above, the rotary members are rotatably supported on the supporting members provided on the vehicle body and slide member, and the resin protector holds the longitudinal end portions of the corrugated tube between the rotary members and the corrugated tube and threads the wire harness. That is, the corrugated tube is used as a sheath member on an intermediate part in a wire harness arranging area between the vehicle body and the slide member and the opposite ends of the corrugated tube are held by the protector having a higher hardness than the corrugated tube. Accordingly, it is possible to prevent the corrugated tube from hanging down and from interfering with peripheral members.

As described above, the protector and rotary member are formed into the different elements, the protector is provided on the upper and lower surfaces at the coupling side to the rotary member with the projections, and the rotary member is provided on the upper and lower surfaces with the through-holes that receive the projections rotatably in the right and left directions. Consequently, it is possible to rotatably couple the protector and rotary member to each other and it is possible to permit the wire harness to follow the motion of the slide member, even if the corrugated tube has a relatively short length. Furthermore, when the wire harness that follows the slide member rotates in the right and left directions, the coupling end of the protector contacts with the inner surface of the side wall of the rotary member to restrain the protector from rotating in the right and left directions. Consequently, it is possible to prevent the wire harness from interfering with the peripheral members on account of a high flexibility in rotation of the protector and is possible to prevent electrical wires from being damaged due to repetition of a great bending of the wire harness.

Also, as described above, the protector is further divided into a plurality of segments in accordance with the length of the protector. One segment of the protector is provided on the upper and lower surfaces with the projections and the other segment of the protector is provided in the upper and lower surfaces with the through-holes, as is the case with the coupling portion between the protector and the rotary member. The projections on the one segment are inserted into the through-holes in the other segment to rotatably couple the respective segments. Thus, it is possible to permit the wire harness to follow the motion of the slide member. Furthermore, when the wire harness that follows the slide member rotates in the right and left directions, the coupling end of the protector contacts with the inner surface of the side wall of the rotary member to restrain the protector from rotating in the right and left directions. Consequently, it is possible to prevent the wire harness from interfering with the peripheral members on account of a high flexibility in rotation of the protector and is possible to prevent electrical wires from being damaged due to repetition of a great bending of the wire harness.

Also, as described above, the rotary member or the protector is provided on opposite side walls at the end side having the through-holes with a cover having an arcuate side wall. The rotary member or the protector is provided on the opposite side walls at the end side having projections of an adjacent protector with protrusions that can be inserted into the cover and have an arcuate side surface. Thus, if the protector rotates in the right or left direction when the wire harness is bent, the protrusions of the protector that have the arcuate side wall is deeply inserted into an inner part of the cover of the rotary member at an inner peripheral side of the bent wire harness and the protrusions of the protector are drawn out from the cover of the rotary member at an outer peripheral side of the bent wire harness. The covers and the outward drawn protrusions do not expose the wire harness from a coupling portion between the rotary member and the protector.

Accordingly, the protector and rotary member, and the intermediate corrugated tube, constructed above, do not expose the wire harness outward over the entire arranging area, thereby protecting the wire harness in good appearance.

Figure 1:
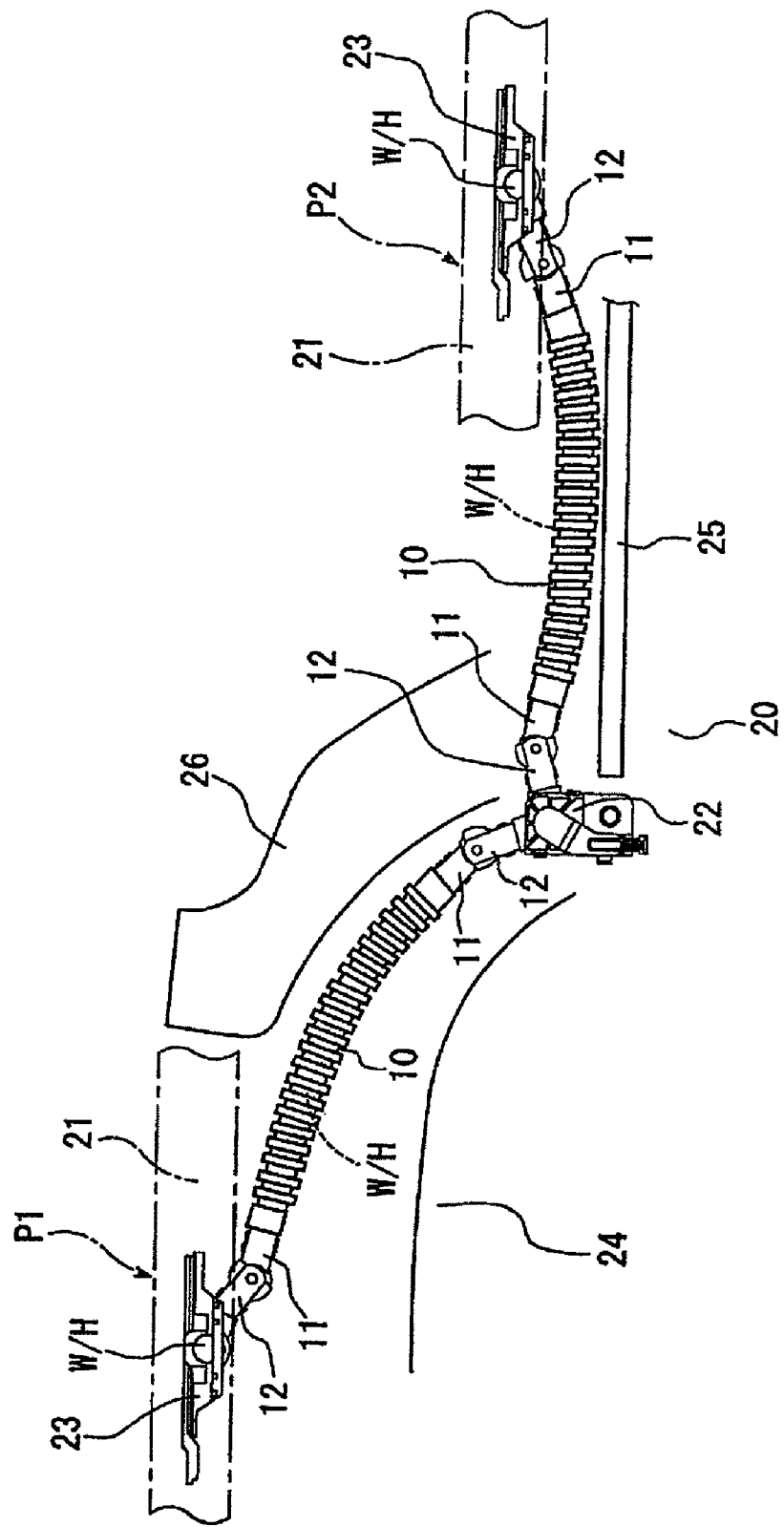
FIG. 1 is a plan view of an embodiment of an arranging structure of a wire harness for a motor vehicle in accordance with the present invention.

EXPLANATION OF SIGNS 10 corrugated tube
11, 111, 112 protectors
   11*a* tube holding portion
   11*a*-1 uneven portions
   11*b* upper surface
   11*c* lower surface
   11*b*-1, 11*c*-1 projections
   11*b*-2, 11*b*-3, 11*c*-2, 11*c*-3 side end portions
   11*d*, 11*e* side walls
   11*d*-1, 11*e*-1 protrusions
12 rotary member
   12*b*, 12*f* upper surfaces
   12*c*, 12*g* lower surfaces
   12*b*-1, 12*c*-1 through-holes
   12*d*, 12*e* side walls
   12*d*-1, 12*e*-1 covers
   12*f*-1, 12*g*-1 cylindrical portions
20 vehicle body
21 slide door
22, 23 supporting members
   23*a*-1, 23*a*-2 receiving portions
   23*b*-1, 23*b*-2 fixing portions
   23*c*-1, 23*c*-2 bolt through-holes
   23*d* drawing passage
24 tire house
25 slide rail
26 lower arm

DETAILED DESCRIPTION OF THE INVENTION

Referring now to the drawings, an embodiment of an arranging structure of a wire harness for a motor vehicle in accordance with the present invention will be described below.

FIGS. 1 to 8 show the embodiment of an arranging structure of a wire harness for a motor vehicle in accordance with the present invention.

As shown in FIG. 1, a wire harness W/H is spanned between a vehicle body 20 and a slide door 21. A corrugated tube 10 sheathes an intermediate part of the wire harness W/H. A protector 11 is fitted on each of the opposite ends of the corrugated tube 10 in a longitudinal direction. Furthermore, a rotary member 12 is rotatably supported on each of supporting members 22 and 23 provided on the vehicle body 20 and the slide door 21, respectively. The protector 11 is coupled to the rotary members 12. The wire harness W/H is inserted into the protector 11 and rotary members 12. The wire harness W/H is drawn out from the protector 11 and rotary members 12 through the supporting members 22 and 23 to the vehicle body 20 and slide door 21, respectively.

In the present embodiment, as shown in FIG. 1, the protector 11 and rotary member are formed into different elements.

The corrugated tube 10 that sheathes the intermediate part of the wire harness W/H is made of polypropylene (PP). A length of the corrugated tube 10 is set to be a maximum length (240 mm (millimeters) in the present embodiment) in which the wire harness W/H does not interfere with peripheral members during an entire process in which the wire harness W/H follows an motion of the slide door 21.

Figure 2:
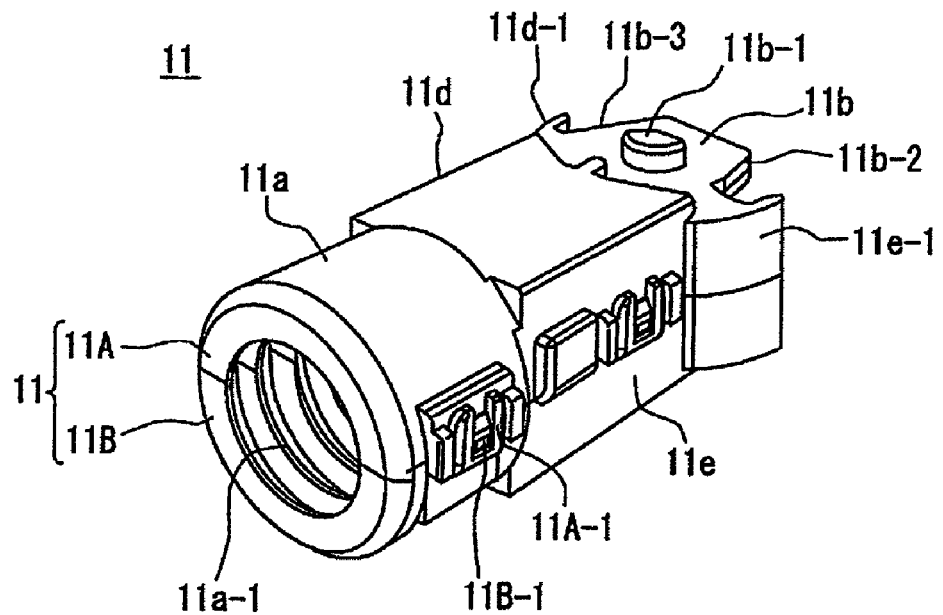
FIG. 2 is a schematic perspective view of a protector in the embodiment shown in FIG. 1.

On the other hand, the protector 11 that holds each of the opposite ends of the corrugated tube 10 in the longitudinal direction is made of polybutylene terephthalate (PBT). As shown in FIG. 2, a cylindrical tube holding portion 11*a* that holds each end of the corrugated tube 10 is continuously provided on an entire length of an inner peripheral surface with annular uneven portions 11*a*-1 that engage with annular uneven portions of each end of the corrugated tube 10.

The protector 11 is provided with projections 11*b*-1 and 11*c*-1 on an upper surface 11*b* and a lower surface 11*c* of an end (a coupling side to the rotary member 12) opposite from the tube holding portion 11*a*. Furthermore, the protector 11 is provided with protrusions 11*d*-1 and 11*e*-1 that have arcuate side walls on opposite side walls 11*d* and 11*e* at the end sides provided with the projections 11*b*-1 and 11*c*-1.

Figure 3:
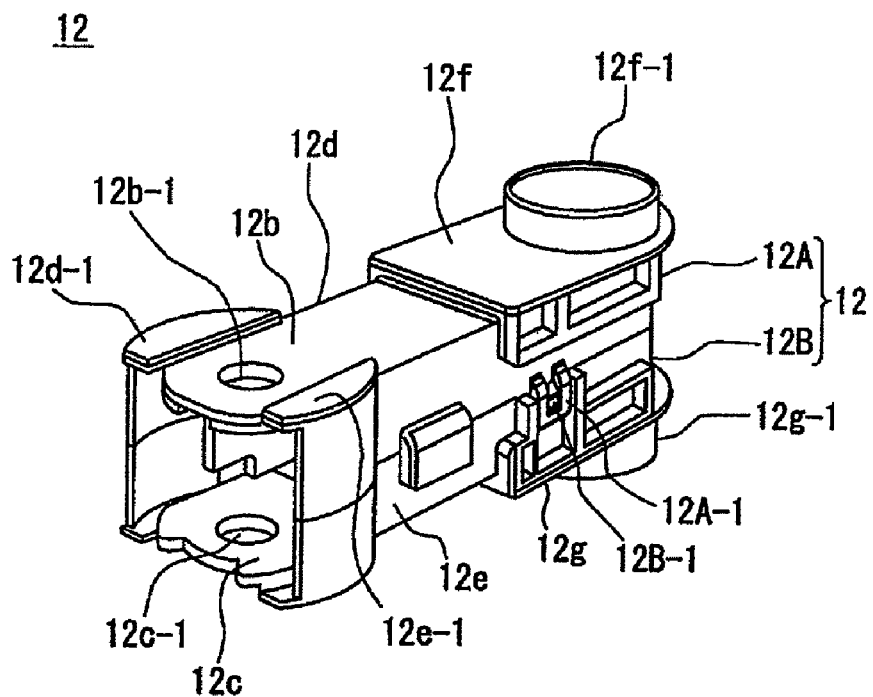
FIG. 3 is a schematic perspective view of a rotary member in the embodiment shown in FIG. 1.

The rotary member 12 to be coupled to the protector 11 is made of a resin material, such as polybutylene terephthalate (PBT) or polyacetal (POM). As shown in FIG. 3, the rotary member 12 is provided on an upper surface 12*b* and a lower surface 12*c* at the coupling side to the protector 11 with through-holes 12*b*-1 and 12*c*-1 that receive and hold the upper and lower projections 11*b*-1 and 11*c*-1 of the protector 11.

Also, the rotary member 12 is provided with covers 12*d*-1 and 12*e*-1 on the opposite side walls 12*d* and 12*e* at the end sides on which the through-holes 12b-1 and 12c-1 is provided. The covers 12d-1 and 12e-1 have arcuate side walls and receive right and left protrusions 11d-1 and 11e-1 of the protector 11.

In the present embodiment, a length of the protector 11 in the longitudinal direction is substantially the same as that of the rotary member 12.

Figure 4:
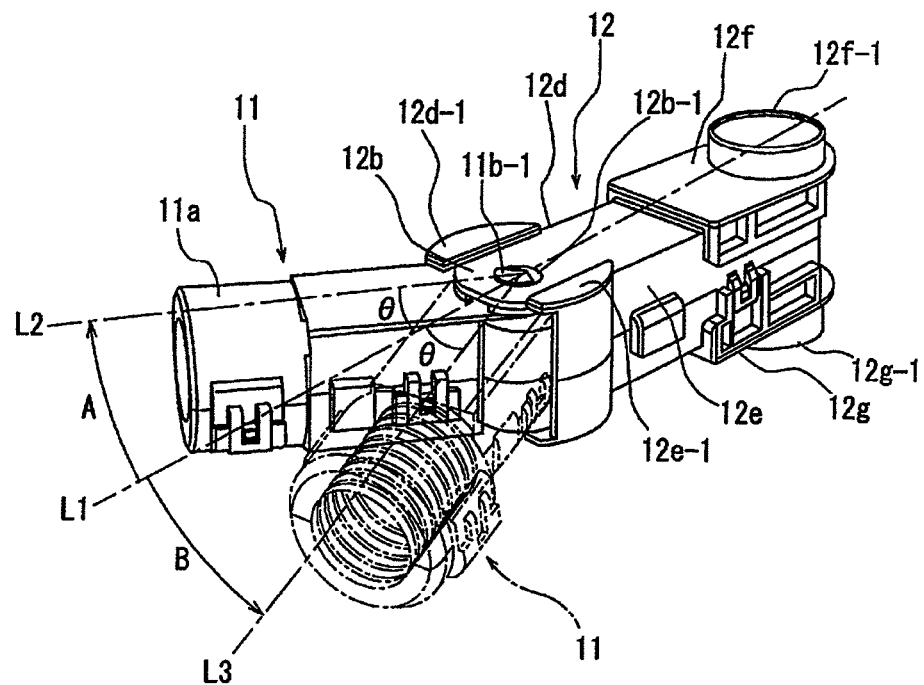
FIG. 4 is a schematic perspective view of the protector and rotary member coupled to each other.

Thus, when the upper and lower projections 11b-1 and 11c-1 of the protector 11 are inserted into the through-holes 12b-1 and 12c-1 in the rotary member 12, respectively, as shown in FIG. 4, the protector 11 is coupled to the rotary member 12 so that the protector 11 can rotate in the right and left directions (directions shown by arrows B and A).

When the rotary member 12 and protector 11 are coupled to each other on a straight line L1 so that axes of the protector 11 and rotary member 12 accord with the straight line L1, the protector 11 can rotate in the direction shown by the arrow A by a given angle.(theta) (25 degrees in the present embodiment) relative to the straight line L1. When the protector 11 moves the axis from the line L1 to a line L2, the side end portions 11b-2 and 11c-2 of the upper surface 11b and lower surface 11c at the coupling end of the protector 11 contact with an inner surface of the side wall 12e of the rotary member 12, so that the protector 11 does not rotate over the given angle.(25 degrees in the present embodiment) in the direction shown by the arrow A (see FIG. 5).

Similarly, when the rotary member 12 and protector 11 are coupled to each other on the straight line L1 so that axes of the protector 11 and rotary member 12 accord with the straight line L1, the protector 11 can rotate in the direction shown by the arrow B by a given angle.(25 degrees in the present embodiment) relative to the straight line L1. When the protector 11 moves the axis from the line L1 to a line L3, the side end portions 11b-3 and 11c-3 of the upper surface 11b and lower surface 11c at the coupling end of the protector 11 contact with an inner surface of the side wall 12d of the rotary member 12, so that the protector 11 does not rotate over the given angle.(25 degrees in the present embodiment) in the direction shown by the arrow B (see FIG. 6).

Figure 5:
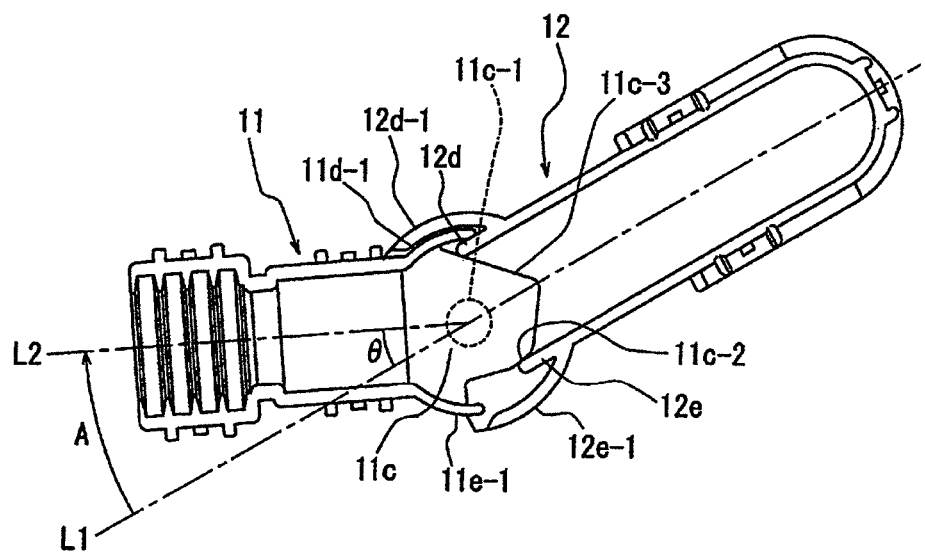
FIG. 5 is a longitudinal cross section view of the protector and rotary member shown in FIG. 4, illustrating a position in which a side end portion of a coupling side lower surface of the protector contacts with an inner surface of a side wall of the rotary member when the protector is rotated by an angle. (theta) in a direction shown by an arrow A with respect to a straight line L1.
Figure 6:
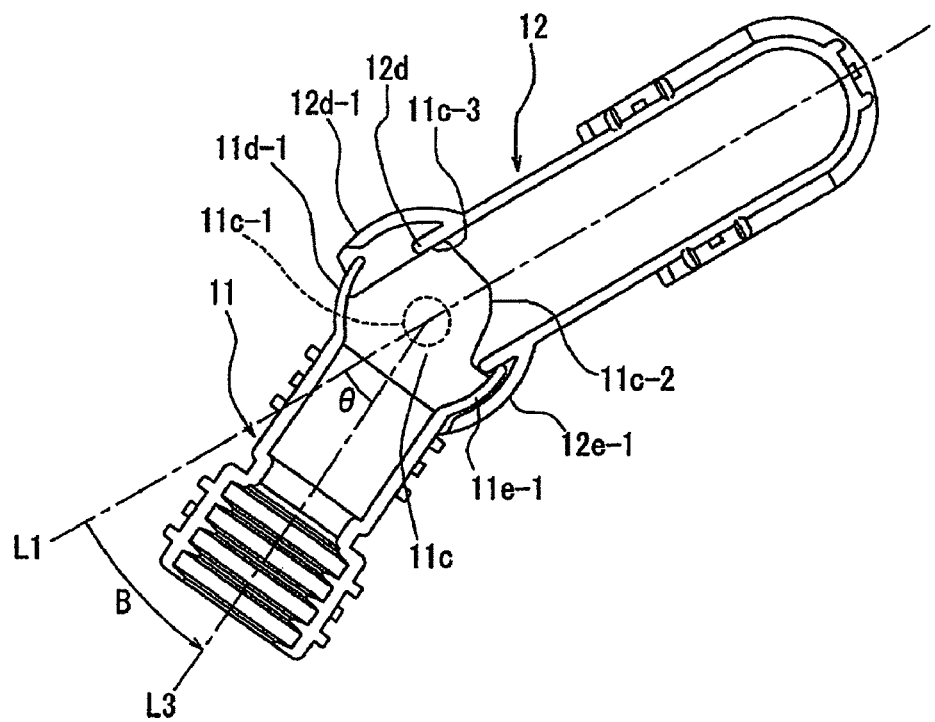
FIG. 6 is a longitudinal cross section view of the protector and rotary member shown in FIG. 4, illustrating a position in which a side end portion of a coupling side lower surface of the protector contacts with an inner surface of a side wall of the rotary member when the protector is rotated by an angle. (theta) in a direction shown by an arrow B with respect to the strait line L1.

FIGS. 5 and 6 show the positions where the side end portions (11c-2, 11c-3) of the lower surface 11c of the protector 11 contact with the inner surfaces of the side walls 12e and 12d of the rotary member 12.

As shown in FIG. 5, if the protector 11 rotates in the right or left direction when the wire harness W/H is bent, the protrusion 11d-1 of the protector 11 that has the arcuate side wall is deeply inserted into an inner part of the cover 12d-1 of the rotary member 12 at an inner peripheral side of the bent wire harness and the protrusion 11e-1 of the protector 11 is drawn out from the cover 12e-1 of the rotary member 12 at an outer peripheral side of the bent wire harness. Thus, the covers 12d-1 and 12e-1 and the outward drawn protrusion 11e-1 do not expose the wire harness W/H from a coupling portion between the rotary member 12 and the protector 11. The position shown in FIG. 6 does not expose the wire harness W/H, as is the case with the position shown in FIG. 5.

Figure 7:
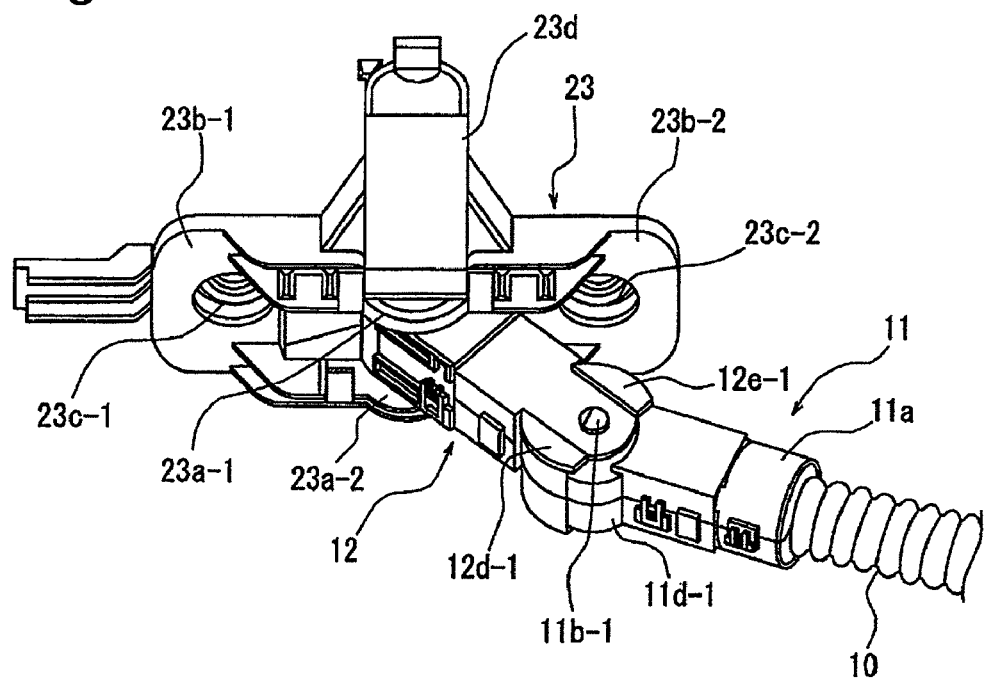
FIG. 7 is a perspective view of the rotary member coupled to the protector, illustrating the rotary member that is supported by a supporting member at a slide door side.

Also, as shown in FIG. 7, the rotary member 12 is rotatably supported on the supporting member 23 of the slide door 21.

The rotary member 12 at a coupling side to the supporting member 23 is provided on an upper surface 12f (FIG. 4) with an upward projecting cylindrical portion 12f-1 for drawing the wire harness W/H to the supporting member 23 and the rotary member 12 at a coupling side to the supporting member 22 (FIG. 8) is also provided on a lower surface 12g (FIG. 4) at a position corresponding to the cylindrical portion 12f-1 on the upper surface 12f with a downward projecting cylindrical portion 12g-1 having the same configuration as that of the portion 12f-1. The upward and downward projecting cylindrical portions 12f-1 and 12g-1 serve as a rotary axle for the rotary member 12 (see FIG. 3). That is, the supporting member 23 is provided on central upper and lower sides with receiving portions 23a-1 and 23a-2 having through-holes. The upward and downward projecting cylindrical portions 12f-1 and 12g-1 of the rotary member 12 are inserted into the through-holes in the receiving portions 23a-1 and 23a-2 to support the cylindrical portions 12f-1 and 12g-1. Thus, the rotary member 12 can be rotatably supported on the supporting member 23.

The supporting member 23 is provided on opposite sides with fixing portions 23b-1 and 23b-2 that are secured to the slide door 21. The fixing portions 23b-1 and 23b-2 are provided with bolt through-holes 23c-1 and 23c-2.

The wire harness W/H is drawn out through the cylindrical portion 12f-1 of the rotary member 12 to the supporting member 23 and through a drawing passage 23d in the supporting member 23 coupled to the cylindrical portion 12f-1 into the slide door 21. A connector (not shown) connected to an end of the wire harness W/H is connected to a connector (not shown) connected to an end of a door harness.

Figure 8:
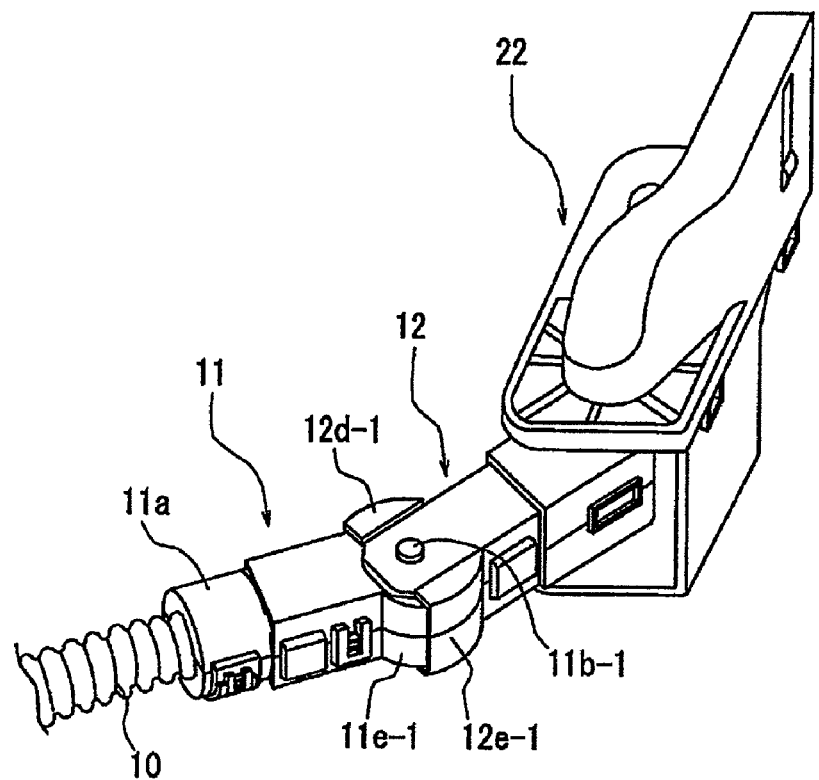
FIG. 8 is a perspective view of the rotary member coupled to the protector, illustrating the rotary member that is supported by a supporting member at a vehicle body side.

A supporting member 22 of the vehicle body 20 shown in FIG. 8 rotatably supports the rotary member 12, as is the case with the supporting member 23 of the slide door 21.

In the present embodiment, the protector 11 is divided into half segments 11A and 11B along an axial direction. When a locking portion 11A-1 provided on the half section 11A is engaged with a portion being locked 11B-1 provided on the half section 11B, the protector 11 is formed.

The rotary member 12 is also divided into half segments 12A and 12B along an axial direction. When a locking portion 12A-1 provided on the half section 12A is engaged with a portion being locked 12B-1 provided on the half section 12B, the rotary member 12 is formed.

FIG. 1 shows an arranging structure of a wire harness W/H spanned between the vehicle body 20 and the slide door 21 in the present embodiment. P1 in FIG. 1 illustrates a position where the slide door 21 is completely opened while P2 in FIG. 1 illustrates a position where the slide door 21 is completely closed.

When the slide door 21 is completely opened, the wire harness W/H is disposed between a tire house 24 and a lower arm 26. When the slide door 21 is completely closed, the wire harness W/H is disposed along a slide rail 25.

As described above, since the corrugated tube 10 sheathes the wire harness W/H, it is possible to reduce a cost of a product in comparison with the case where the wire harness W/H is threaded in a crawler type cable guide. Since the flexible corrugated tube 10 can absorb an upward and downward movement of the slide door 21, it is possible to permit the wire harness W/H to smoothly follow a movement of the slide door 21 without providing an additional device, such as an upward and downward movement mechanism. Since the corrugated tube 10 sheathes the wire harness W/H, the wire harness W/H is not exposed outward. Accordingly, it is not necessary to provide a tubular body that covers a cable guide in the case of inserting the wire harness W/H into the cable guide and it is possible to reduce the number of parts.

As described above, the corrugated tube 10 is used as a sheath member on an intermediate part in a wire harness arranging area between the vehicle body 20 and the slide door 21 and the opposite ends of the corrugated tube 10 are held by the protector having a higher hardness than the corrugated tube 10. Accordingly, it is possible to prevent the corrugated tube 10 from hanging down and from interfering with peripheral members.

Also, as described above, the protector 11 and rotary member 12 are made of different elements. The protector 11 is provided with the projections 11b-1 and 11c-1 on the upper and lower surfaces 11b and 11c on the end at the coupling side to the rotary member 12. The projections 11b-1 and 11c-1 of the protector 11 are inserted into the through-holes 12b-1 and 12c-1 provided in the upper and lower surfaces 12b and 12c of the rotary member 12 so that the protector 11 can rotate in the right and left directions relative to the rotary member 12. Consequently, even if the corrugated tube 10 has a relatively short length, it is possible to permit the wire harness W/H to follow the movement of the slide door 21. Furthermore, when the wire harness W/H rotates in the right and left directions while the wire harness W/H is following the slide door 21, the distal ends 11c-2 (11b-2) and 11c-3 (11b-3) of the protector 11 at the coupling side contact with the inner surfaces of the side walls 12e and 12d of the rotary member 12 to restrain the protector 11 from rotating in the right and left directions. Consequently, it is possible to prevent the wire harness W/H from interfering with the peripheral members on account of a high flexibility in rotation of the protector 11 and is possible to prevent electrical wires from being damaged due to repetition of a great bending of the wire harness W/H.

Also, in the present embodiment, since the protector 11 is restrained from rotation within an angle of 25 degrees in the right and left directions, it is possible to share the protectors 11 at the vehicle side and the slide door side.

As described above, the rotary member 12 is provided on the opposite side walls 12d and 12e at the end sides, in which the through-holes 12b-1 and 12c-1 are formed, with the covers 12d-1 and 12e-1 having arcuate side walls and on the opposite side walls 11d and 11e at the end side, on which the projections 11b-l and 11c-l of the adjacent protector 11 are formed, with the protrusions 11d-1 and 11e-1 that have the arcuate side walls that can be inserted into the covers 12d-1 and 12e-1. Consequently, even if the wire harness W/H is in a bent state, the covers 12d-1 and 12e-1 and the protrusion 11d-1 (11e-1) drawn outward do not expose the wire harness W/H from the coupling portion between the rotary member 12 and the protector 11.

Accordingly, the protector 11 and rotary member 12, and the intermediate corrugated tube 10, constructed above, do not expose the wire harness W/H outward over the entire arranging area, thereby protecting the wire harness W/H in good appearance.

Figure 9:
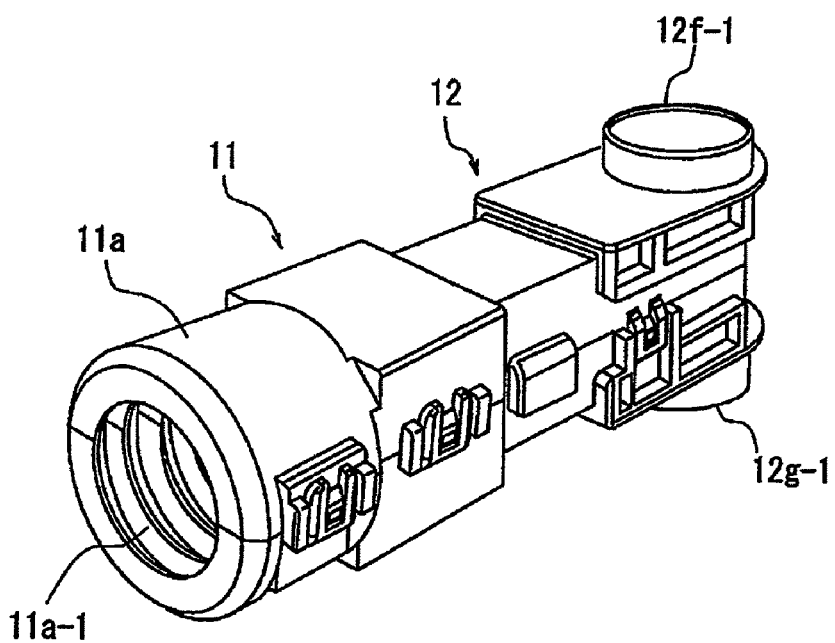
FIG. 9 is a perspective view of an integrated protector and rotary member assembly.
Figure 10:
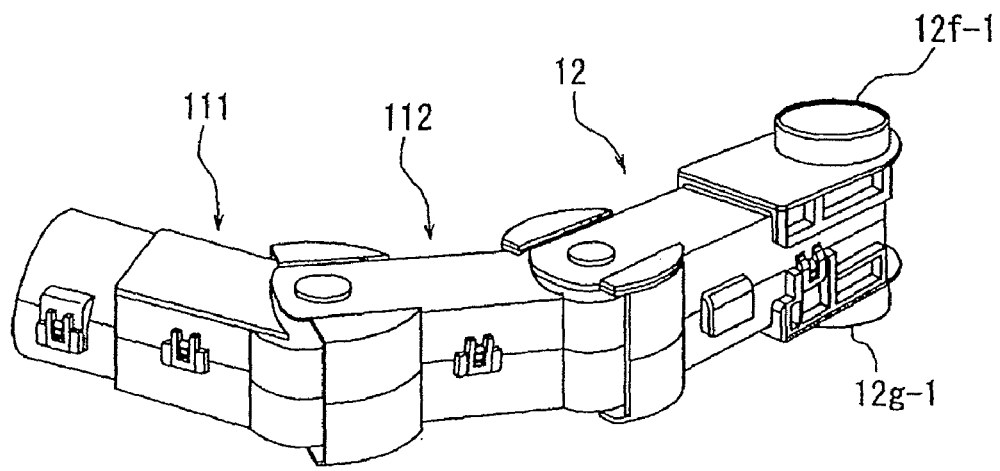
FIG. 10 is a perspective view of the protector that is divided into a plurality of segments and is assembled to a protector unit.
Figure 11:
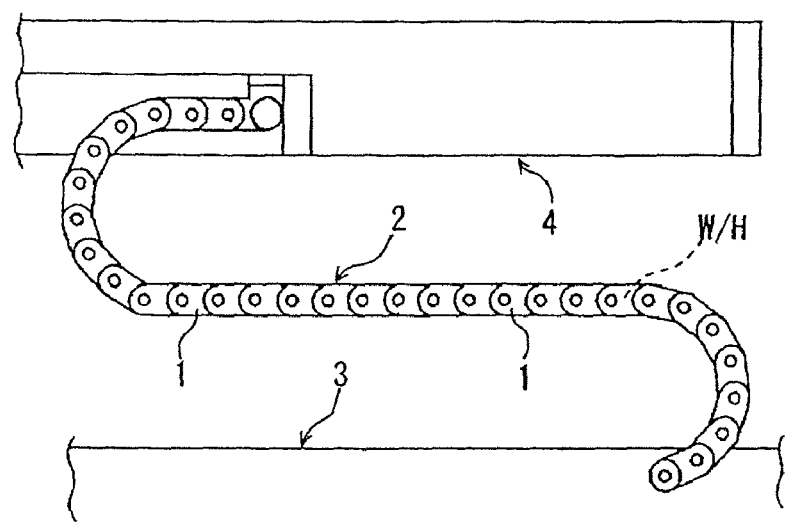
FIG. 11 is plan view of a prior art arranging structure of a wire harness for a motor vehicle.
Figure 12:
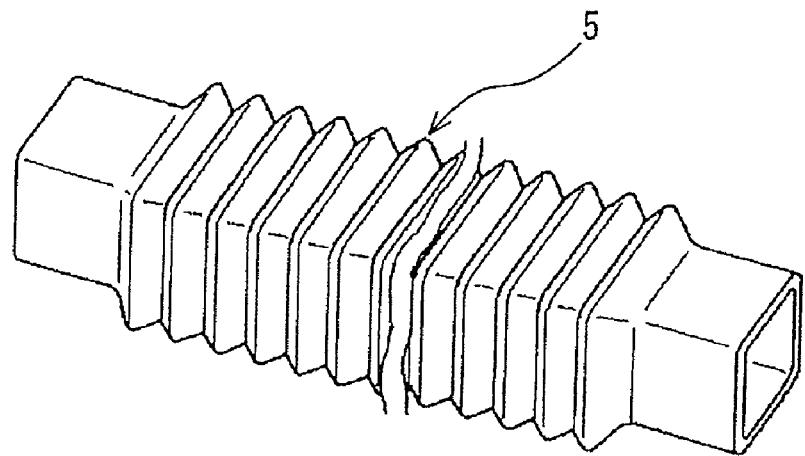
FIG. 12 is a perspective view of a tubular body to be used in a prior art arranging structure of a wire harness.
Figure 13:
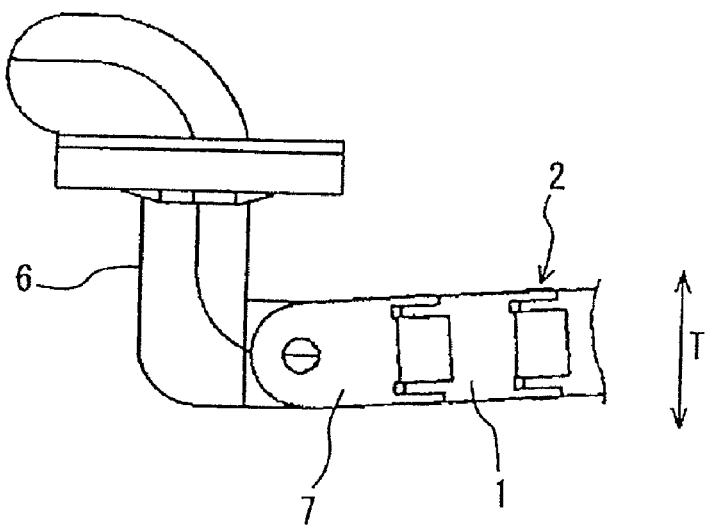
FIG. 13 is a plan view of another prior art arranging structure of a wire harness.

It should be noted that the present invention is not limited to the above embodiment. In accordance with lengths of the corrugated tube 10 and protector 11, the protector 11 and rotary member 12 may be integrated, as shown in FIG. 9. Also, as shown in FIG. 10, the protector 11 may be divided into a plurality of segments 111, 112 and the divided segments 111, 112 may be coupled through the rotary members 12 to one another.

The invention claimed is:

1. An arranging structure of a wire harness for a motor vehicle wherein said wire harness is spanned between a vehicle body and a slide member, comprising:
   a corrugated tube for sheathing said wire harness;
   a protector made of a resin material, said protector holding opposite ends of said corrugated tube in a longitudinal direction and threading said wire harness; and
   a rotary member coupled to said protector as a different element from said protector, said rotary member being rotatably supported on supporting members provided on said vehicle body and said slide member;
   wherein said protector is provided with projections on upper and lower surfaces of an end at a coupling side to said rotary member, said rotary member is provided on upper and lower surfaces with through-holes, and said protector and said rotary member are coupled to each other rotatably in right and left directions by inserting said projections into said through-holes;
   wherein when said wire harness that follows a motion of said slide member rotates in the right and left directions, an end of said protector at the coupling side contacts with an inner surface of a side wall of said rotary member, and a rotary angle of said protector in the right and left directions is restrained within a given range; and
   wherein said rotary member is provided on opposite side walls at the end side having said through-holes with a cover having an arcuate side wall, said protector is provided on the opposite side walls at the end side having projections of an adjacent protector with protrusions that can be inserted into said cover and have an arcuate side surface, and said cover and said protrusions do not expose said wire harness outward when said protector rotates.

2. An arranging structure of a wire harness for a motor vehicle according to claim 1, wherein a length of said corrugated tube that sheathes said wire harness is set to be a length in which said wire harness does not interfere with peripheral members in a whole process in which said wire harness follows the motion of said slide member.

3. An arranging structure of a wire harness for a motor vehicle according to claim 1, wherein said protector that holds said corrugated tube is provided on an inner peripheral surface with annular uneven portions, said annular uneven portions of said protector engage with annular uneven portions on an end of said corrugated tube.

4. An arranging structure of a wire harness for a motor vehicle according to claim 1, wherein said slide member is a slide door.

5. An arranging structure of a wire harness for a motor vehicle wherein said wire harness is spanned between a vehicle body and a slide member, comprising:
   a corrugated tube for sheathing said wire harness;
   a protector made of a resin material, said protector holding opposite ends of said corrugated tube in a longitudinal direction and threading said wire harness; and
   a rotary member integrated with said protector or coupled to said protector as a different element from said protector, said rotary member being rotatably supported on supporting members provided on said vehicle body and said slide member;
   wherein said protector is divided into segments, one segment of said protector is provided on upper and lower surfaces with projections, the other segment of said protector is provided on upper and lower surfaces with through-holes, and said segments are coupled to one another by inserting said projections on the one segment into said through-holes in the other segment;
   wherein when said wire harness that follows a motion of said slide member rotates in the right and left directions, an end of said protector at the coupling side contacts with an inner surface of a side wall of said rotary member, and a rotary angle of said protector in the right and left directions is restrained within a given range; and
   wherein said protector is provided on opposite side walls at the end side having said through-holes with a cover having an arcuate side wall, said protector is provided on the opposite side walls at the end side having projections of an adjacent protector with protrusions that can be inserted into said cover and have an arcuate side surface, and said cover and said protrusions do not expose said wire harness outward when said protector rotates.

6. An arranging structure of a wire harness for a motor vehicle according to claim 5, wherein a length of said corrugated tube that sheathes said wire harness is set to be a length in which said wire harness does not interfere with peripheral members in a whole process in which said wire harness follows the motion of said slide member.

7. An arranging structure of a wire harness for a motor vehicle according to claim 5, wherein said protector that holds said corrugated tube is provided on an inner peripheral surface with annular uneven portions, said annular uneven portions of said protector engage with annular uneven portions on an end of said corrugated tube.

8. An arranging structure of a wire harness for a motor vehicle according to claim 5, wherein said slide member is a slide door.

* * * * *